US012564873B2

(12) United States Patent
Brouwer

(10) Patent No.: US 12,564,873 B2
(45) Date of Patent: Mar. 3, 2026

(54) MOBILE MACHINE TOOL

(71) Applicant: PICUM MT GMBH, Hannover (DE)

(72) Inventor: Dominik Brouwer, Burgwedel (DE)

(73) Assignee: PICUM MT GMBH, Hannover (DE)

( * ) Notice: Subject to any disclaimer, the term of this patent is extended or adjusted under 35 U.S.C. 154(b) by 843 days.

(21) Appl. No.: 17/210,820

(22) Filed: Mar. 24, 2021

(65) Prior Publication Data

US 2021/0299731 A1     Sep. 30, 2021

(30) Foreign Application Priority Data

Mar. 31, 2020     (EP) ..................................... 20167185

(51) Int. Cl.
| | |
|---|---|
| *B21D 43/00* | (2006.01) |
| *B21D 11/20* | (2006.01) |
| *B23Q 9/00* | (2006.01) |
| *B23Q 17/24* | (2006.01) |
| *B25J 5/00* | (2006.01) |
| *B25J 9/16* | (2006.01) |
| *B25J 11/00* | (2006.01) |

(52) U.S. Cl.
CPC ............ *B21D 43/003* (2013.01); *B21D 11/20* (2013.01); *B23Q 9/00* (2013.01); *B23Q 17/2495* (2013.01); *B25J 5/007* (2013.01); *B25J 9/162* (2013.01); *B25J 11/005* (2013.01)

(58) Field of Classification Search
CPC ...... B25D 143/003; B21D 11/20; B23Q 9/00; B23Q 17/2495; B23Q 1/015; B23Q 1/445; B23Q 1/5462; B23Q 1/25; B23Q 1/00; B23Q 11/0032; B23Q 17/00; B23Q 17/2419; B23K 37/02
See application file for complete search history.

(56) References Cited

U.S. PATENT DOCUMENTS

| | | | | |
|---|---|---|---|---|
| 4,536,690 A | * | 8/1985 | Belsterling ............ | B62D 57/02 318/687 |
| 4,872,291 A | * | 10/1989 | Lindsey ................. | B23Q 1/015 408/234 |
| 6,059,703 A | * | 5/2000 | Heisel ................ | B23Q 11/0014 409/145 |
| 6,430,472 B1 | * | 8/2002 | Boillot ................. | G05B 19/056 901/41 |
| 9,669,503 B2 | * | 6/2017 | Schneider ................ | B23Q 1/34 |
| 2003/0120377 A1 | * | 6/2003 | Hooke ................... | B25J 19/022 700/193 |
| 2012/0239184 A1 | * | 9/2012 | Cho ........................ | B25J 18/02 700/228 |
| 2017/0354468 A1 | * | 12/2017 | Johnson ................. | A61B 34/74 |

FOREIGN PATENT DOCUMENTS

| | | | |
|---|---|---|---|
| CN | 107139165 A | * | 9/2017 |
| DE | 10044859 A1 | | 4/2002 |
| EP | 0 109 201 A2 | | 5/1984 |
| EP | 0 256 853 A1 | | 2/1988 |
| WO | 2002/034461 A2 | | 5/2002 |

* cited by examiner

*Primary Examiner* — Nhi Q Bui
(74) *Attorney, Agent, or Firm* — WCF IP

(57) ABSTRACT
A mobile machine tool includes a main body, a machine bed head, and an end effector. The main body permits the machine tool to stand on the ground. The machine bed head is cantilevered relative to the main body. The end effector is guided on the machine bed head by a positioning system. The machine bed head is attached to the main body by a mechanically overdetermined frame.

27 Claims, 3 Drawing Sheets

MOBILE MACHINE TOOL

FIELD OF THE INVENTION

The invention relates to a mobile machine tool with (a) a main body with which the machine tool stands on the ground, (b) a machine bed head that is cantilevered relative to the main body, and (c) an end effector that is guided on the machine bed head by means of a positioning system. This type of machine tool is known from EP 0 109 201 A2 and can be used, for example, to process an outer hull of a ship. However, such a machine is not suitable for being driven to a large tool such as a die and processing the die quickly and with high accuracy on site, as it is not sufficiently rigid.

The invention also relates to a method for processing a workpiece, in particular a die.

BACKGROUND

To accomplish such a task, it is favourable, albeit not essential, for the machine bed head to have as large a working range as possible relative to the main body. The working range is the set of all points that can be reached by the end effector for processing. It is also desirable for a natural frequency of a vibration of the end effector to be as high as possible and a rigidity with regards to a deflection of the end effector relative to the workpiece to be processed to be as high as possible.

However, these desirable properties are in competition with one another: namely, the greater the rigidity and higher the natural frequency, the smaller the working space. In addition, a high degree of rigidity and a high natural frequency usually lead to complex and therefore costly machine tools.

US 2003/0 120 377 A1 describes a mobile machine tool which has an end effector whose position is determined by means of a laser measurement system. This allows the position of the end effector to be measured with greater accuracy. The disadvantage of such a system is that it exhibits a relatively low degree of rigidity and is therefore not suitable for processing dies, for example.

EP 0 256 853 A1 describes a rigid fixing device with six rods which form a tetrahedral structure. A tool can be attached to the fixing device. The tool is moved, but the fixing device is immobile in order to increase its rigidity.

DE 100 44 859 A1 describes a positioning device with four joints arranged in pairs opposite each another on a support. The positioning device is one time mechanically overdetermined to create an electronic preload. The disadvantage of such a system is that movement is only possible in three degrees of freedom.

WO 02/34461 A2 describes a cantilevered machine tool with a hexapod drive. The disadvantage of such a machine tool is that it is either rigid or fast, but not both at the same time.

SUMMARY

The invention aims to propose an improved mobile machine tool.

The advantage of such a machine tool is that the machine bed head can be attached to the main body with a high degree of rigidity.

If the frame is, as in accordance with a preferred embodiment, designed in such a way that the position of the machine bed head relative to the main body can be changed by extending at least one of the rods, the machine bed head can be adjusted to a predetermined position by means of the frame. This increases the working range of the machine bed head.

By using the mechanically overdetermined frame, essentially only tensile and/or compressive forces act on its struts and no or only negligibly small bending forces. This generally leads to a high rigidity with a small mass. In addition, a modular and thus simpler structure can often be achieved.

Within the scope of the present description, the main body should be understood in particular to mean the part of the machine tool which stands on the ground.

The machine bed head should be understood to mean a component of the machine tool relative to which the end effector is guided by means of the positioning system. The positioning system is part of the machine bed head. The machine bed head is attached to the main body by means of the frame. Preferably, a distance between the machine bed head and the main body is at least 50 cm, particularly at least 100 cm, preferably at least 150 cm.

The feature that the machine bed head is cantilevered relative to the main body should be understood particularly to mean that the machine bed head is attached to the main body in such a way that the main body can be driven up to a workpiece, such as a lower tool of a die, and in this position the end effector can process a surface of the die block. It is favourable, but not essential, for no further element of the machine tool to be arranged below the machine bed head.

The feature that the frame is mechanically overdetermined should be understood particularly to mean that an extension of one of the struts leads to constraining forces on at least one other strut, in particular on at least two further struts. A mechanically overdetermined frame could also be described as a statically indeterminate frame. In particular, the degree n of indeterminacy is at least $n=2$.

The end effector is referred to as the last link in a kinematic chain. The end effector is preferably a unit for welding, printing, milling, polishing, tapping or hardening or laser machining.

It is beneficial if the frame forms a hexapod structure. In particular, the frame comprises at least 6 rods which form a parallel kinematic system, meaning that at least one imaginary extension of one of the rods leads to a movement of the machine bed head in at least one degree of freedom. It should be noted that it is beneficial, but not essential, for at least one part of the struts of the frame to be extendible in length.

According to a preferred embodiment, the struts differ in their natural frequencies by at least 3%, particularly at least 5%, especially preferably at least 10%. This results in sufficiently high damping for the entire frame at all excitation frequencies applied to the end effector.

Preferably, at least three struts, particularly at least four struts, differ in their natural frequencies in pairs by at least 5%, particularly at least 7%, especially preferably at least 10%. This feature should be understood to mean that for each natural frequency, the following applies: every other natural frequency of another strut differs from this natural frequency by at least the specified percentage, for example 5%.

This percentage is calculated by dividing the larger natural frequency by the small natural frequency.

It is especially convenient if all the struts differ in their natural frequencies in pairs by at least 3%, particularly at least 5%, especially preferably at least 7%.

The frame is preferably at least doubly overdetermined, in particular at most fourfold. An at least double overdetermination leads to a particularly high degree of rigidity. A more than fourfold mechanical overdetermination leads to a relatively complex frame.

The natural frequency should be understood particularly to mean the natural frequency with the smallest frequency. This natural frequency can also be referred to as the base natural frequency.

According to a preferred embodiment, the struts are designed and arranged in such a way that a rigidity of the end effector with regard to a movement in the vertical direction is at least 1.3-times, particularly at least 1.5-times, especially preferably at least two times, as great as a rigidity of the end effector with regard to a movement in a transverse direction that extends perpendicular to the former direction.

It is especially favourable if a rigidity of the end effector with regard to a movement in a second transverse direction, which extends perpendicular to the vertical direction and perpendicular to the first transverse direction, is at least 1.3-times, particularly at least 1.5-times, especially preferably at least two times, as great as a rigidity of the end effector with regard to a movement in the first transverse direction.

It is convenient if the rigidity of the end effector in all directions is at least 0.5 newtons per micrometer, in particular at least 1.5 newtons per micrometer. Preferably, there is at least one direction in which the rigidity is at least 3 newtons per micrometer. In general, the rigidity in at least two spatial directions, particularly in all spatial directions, is at most 100 newtons per micrometer, in particular at most 50 newtons per micrometer.

It is favourable if at least one of the struts comprises a pre-loading device, by means of which the strut can be braced against the other struts. If the frame has N struts, it is beneficial if at least (N-6) struts feature a pre-loading device. In particular, it is possible and preferable for all struts to comprise a pre-loading device or for all struts but one to comprise a pre-loading device.

The pre-loading device should be understood to mean a device by means of which the length of the respective strut can be changed. This strut can thus be braced against the other struts. The pre-loading device can feature, for example, a screw drive. For example, by rotating a component of the pre-loading device, which features, for instance, an inner thread, this component can be displaced in relation to another component which, in the example selected, has an outer thread. The structure of such pre-loading devices is especially simple. However, it is also possible, for example, for the pre-loading device to feature a cylinder, particularly a hydraulic cylinder.

All struts preferably have a base point, with which they are attached to the main body, as well as a head point, by means of which they are attached to the machine bed head.

It is favourable if at least four of the struts are articulated on the main body. Preferably, the joint by means of which the respective strut is articulated on the main body has at least two degrees of freedom. This means that the strut can be moved in two degrees of freedom, preferably swivel degrees of freedom, relative to the main body. It is particularly favourable if the joint is a ball joint. A ball joint allows for a movement in three degrees of freedom, namely two degrees of freedom with regard to a swivel movement and one degree of freedom about a rotational axis of the ball joint.

It is convenient if the positioning system has at least three axles. In particular, the end effector can be moved by means of the positioning system in at least three degrees of freedom relative to the machine bed head. The degrees of freedom are preferably three translation degrees of freedom. In this case, the end effector can be displaced relative to the machine bed head in three degrees of freedom.

The positioning system and the frame are preferably redundant to one another. In particular, the end effector can preferably be moved both by means of the positioning system and by extending lengths of struts of the frame along a predetermined trajectory. It is especially beneficial if the frame forms a hexapod drive; however, this is not essential.

The mobile machine tool preferably comprises a rotation device by means of which the machine bed head is mounted such that it can be rotated relative to the main body, in particular by at least 170°, preferably at least 180°. When processing dies, it is advantageous if both the upper tool and the lower tool can be processed with the same mobile machine tool. To this end, it is advantageous if the machine bed head can be swivelled by means of the rotation device in such a way that it can process the upper tool after processing the lower tool by actuating the rotation device while the position of the machine tool remains otherwise unchanged.

It is especially favourable if the rotation device is arranged in the kinematic chain between the machine bed head and the frame.

The mobile machine tool preferably has a pre-loading device which is attached to the machine bed head at one end and to the main body at the other, and by means of which the frame and the rotation device can be braced.

For example, the rotation device may comprise a rolling bearing or a slide bearing by means of which a machine head side part is connected to a main body side part, wherein the bracing device passes through this bearing. Tensioning the bracing device does not create a tensile force between the machine bed head and the main body, meaning that the machine head side part of the rotation device and the main body side part of the rotation device can be braced against each other.

The invention also solves the problem by way of a mobile machine tool with (a) a main body with which the machine tool stands on the ground, (b) a machine bed head that is cantilevered relative to the main body, and (c) an end effector that is guided on the machine bed head by means of a positioning system, wherein the mobile machine tool comprises a rolling chassis by means of which the machine tool can be moved. In this case it is advantageous, but not essential, for the machine bed head to be attached to the main body by means of a mechanically overdetermined frame. All preferred embodiments specified above also apply for this invention. All embodiments described in the following also apply for the invention described above.

The advantage of this machine tool is that the range of operation in which the end effector can process a workpiece is considerably larger. In addition, the machine tool can be moved relative to the ground via the rolling chassis.

Machine tools are usually fixed in place to ensure that they have the highest possible natural frequency and/or are as rigid as possible. However, it has been proven that a rolling chassis is advantageous, particularly if no excessively large static and dynamic forces occur during processing of the workpiece and/or the requirements regarding positioning accuracy of the end effector are sufficiently low and/or the movement of the end effector relative to the workpiece only requires small accelerations.

Within the scope of the present description, a rolling chassis should be understood to mean a device by means of which the machine tool can be moved.

In other words, the movement of the end effector in space, i.e. relative to a stationary coordinate system, is composed of the movement of the machine bed head caused by the rolling chassis and the movement of the end effector relative to the machine bed head caused by driving the positioning system. Here, the concept of curve and trajectory are the same in terms of content, the concept of curve being used to describe a movement in a machine bed head coordinate system, said movement relating to a coordinate system that is stationary in relation to the machine bead head. The fact that the rolling chassis can move the machine tool by comparatively large distances means that the end effector has a large operation range in relation to the space.

The method preferably comprises the step (v) processing of the workpiece, particularly by build-up welding, while the end effector is moved along the end effector curve.

Preferably, the machine tool has a control unit that is configured to automatically carry out a method featuring the steps (i) detection of a target trajectory of the end effector in space, (ii) driving of the rolling chassis so that that machine tool moves along a rolling chassis trajectory in space, and driving of the positioning system so that the end effector moves along an end effector curve relative to the machine bed head, such that the end effector moves along the target trajectory in space.

It is especially beneficial if the end effector is a build-up welding head. Build-up welding is a machining process in which the material is welded onto the workpiece. In build-up welding, the requirements on the positioning accuracy of the end effector are usually only moderate. Any positioning uncertainties resulting from the movement of the machine tool by means of the rolling chassis are therefore tolerable.

According to a preferred embodiment, the rolling chassis has at least one Mecanum wheel and/or one omni wheel. This allows the machine tool to be moved in any desired direction and rotated about a—usually vertical—rotational axis.

It is especially favourable if the rolling chassis can be brought into a set-down position in which at least 80% of the weight force of the machine tool is not transferred to the ground via the rolling chassis, but via a set-down surface with which the main body stands on the ground after being set down. The rolling chassis can also be brought into a drive position in which the machine tool can be moved by means of the rolling chassis.

It is particularly beneficial if the machine tool features a tracking interferometer designed to determine an end effector position. This end effector position is preferably the position in space, i.e. relative to a stationary coordinate system. The end effector position can also be determined in a coordinate system that is stationary in relation to the workpiece. Since the workpiece is stationary, an end effector position is also stationary with respect to a coordinate system that is fixed relative to the workpiece.

The advantage of the tracking interferometer is that the position of the end effector in space and therefore relative to the workpiece can be determined with greater accuracy. A deviation of the actual position of the end effector from an end effector target position specified by the target trajectory can then be compensated for by means of the positioning system.

It is favourable for the control unit to be configured to automatically carry out a method featuring the steps (i) continuous detection of an end effector position of the end effector in space by means of the tracking interferometer and (ii) control of the end effector position to an end effector target position according to the target trajectory by means of the positioning system.

It is convenient, for example, for there to be two control loops in the control unit. The first control loop detects an end effector relative position in the coordinates of the machine bed head and controls the axle drive of the drive axles of the positioning unit in such a way that the end effector moves along the end effector trajectory specified in the machine head coordinate system. This control loop can also be described as a base control loop.

If the control unit detects a deviation of the actual position of the end effector on the basis of the measurement of the tracking interferometer, the control unit changes the base control loop in such a way that a deviation of the actual position from the target position described by the target trajectory is reduced. For example, the end effector trajectory is adjusted or an offset value added to the end effector trajectory.

The control unit is preferably configured to automatically carry out a method featuring the steps (i) driving of the rolling chassis so that the machine tool moves relative to the ground, (ii) driving of the rolling chassis so that the main body is placed on the ground, (iii) determination of an end effector position of the end effector relative to a workpiece, particularly by means of the tracking interferometer, and (iv) processing, in particular machining, of the workpiece by means of the end effector.

Preferably, the workpiece is first processed by build-up welding, while the rolling chassis moves the machine tool and the kinematic system also preferably moves the end effector; as described above, the rolling chassis is then brought into the set-down position and the workpiece is machined, for example milled and/or polished, especially in the area that was build-up welded.

In order to be able to increase the natural frequency of the mobile machine tool and at the same time keep the weight of the machine tool sufficiently low to be able to transport it easily over longer distances of, for example, more than one kilometre, it is favourable if the machine tool has a weighting element which is attached to the main body such that it can be detached; the weighting element preferably has a mass of at least 300 kilograms, in particular at least 500 grams. Preferably, the weighting element is at least predominantly made of a material whose density exceeds 1 gram per cubic centimeter, particularly 7.5 grams per cubic centimeter, and preferably exceeds 10 grams per cubic centimeter.

The invention also includes a method for processing a workpiece by means of a machine tool according to the invention. The preferred designs of this method are the steps of the method described above.

DESCRIPTION OF THE DRAWINGS

In the following, the invention will be explained in more detail by way of the attached figure. It shows FIG. 1 a machine tool according to the invention and FIG. 2 a detailed view of a strut and FIG. 3 the machine tool according to the invention according to FIG. 1 during the processing of a workpiece.

DETAILED DESCRIPTION

Figure 1:
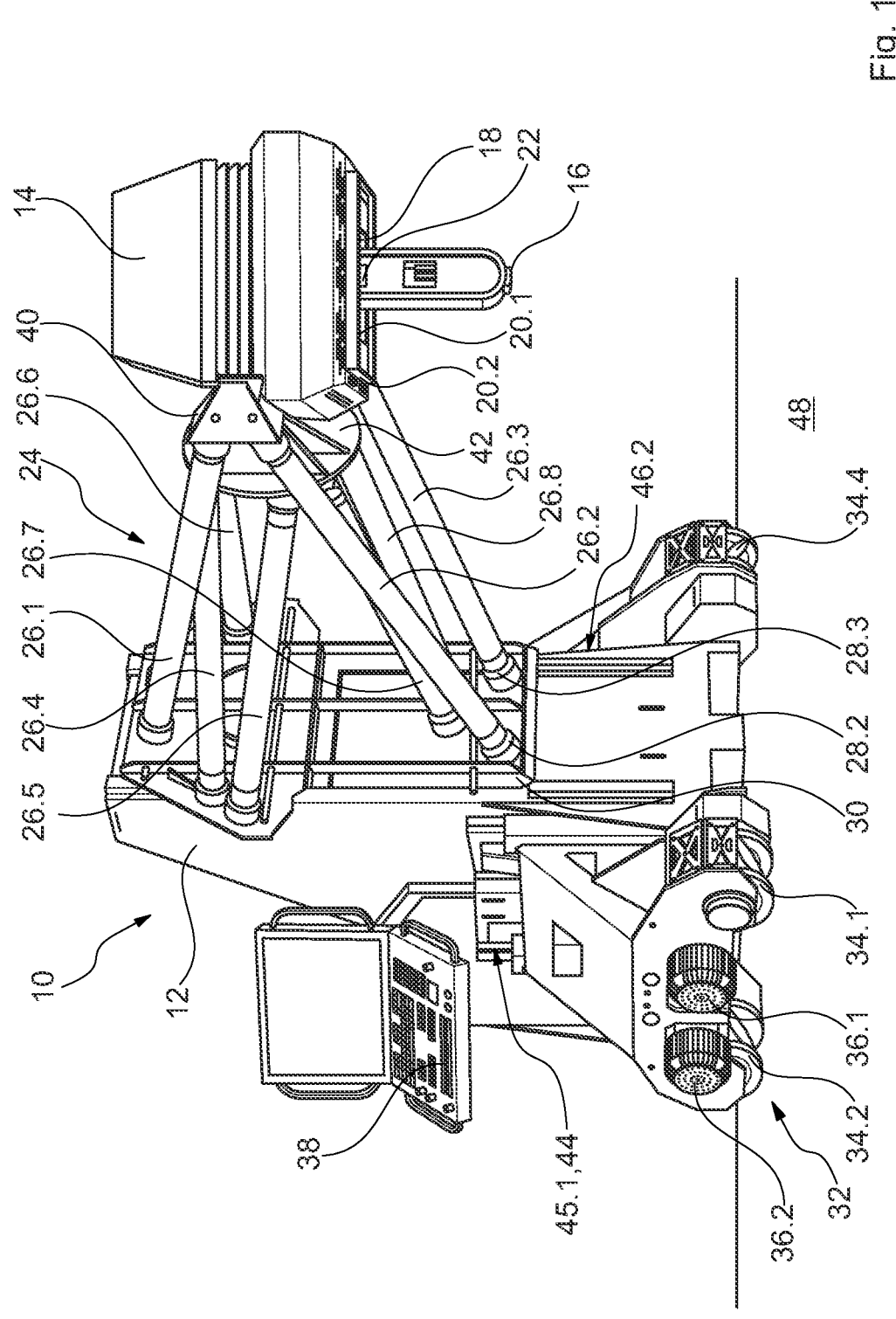

FIG. 1 depicts a machine tool 10 according to the invention which comprises a main body 12, a machine bed head 14 and an end effector 16. The end effector 16 can be positioned by means of a positioning system 18. In the present case, the positioning system is formed by a linear axle 20.1 and a second linear axle 20.2 so that the end effector 16 can be positioned in two translation degrees of freedom. The positioning system 18 may also feature a rotation unit 22 by means of which the end effector can be moved in a rotational degree of freedom.

The main body 12 has a frame 24 by means of which the machine bed head 14 is connected to the main body 12. The frame 24 comprises several struts 26.$i$ ($i$=1, 2, . . . , N). The struts 26.$i$ form a mechanically overdetermined hexapod structure. Irrespective of the other properties, according to a preferred embodiment, the machine tool 10 may have a third linear axle 20.3 by means of which the height of the frame 24 can be adjusted.

Each strut 26.$i$ has a base point 28.$i$ by means of which it is attached to the main body. In the present case, the machine tool 12 features a slide 30 to which the struts 26.$i$ are attached by their respective base points 28.$i$. The slide 30 is attached to the main body 12 such that it can be displaced in the vertical direction. To move the slide 30, the machine tool 10 has a drive, which is not depicted in FIG. 1.

The machine tool 10 comprises a rolling chassis 32. In the present case, the rolling chassis 4 has Mecanum wheels 34.$j$ ($j$=1, 2, 3, 4). Each Mecanum wheel 34.$j$ is driven individually by means of an electric motor 36.$j$ so that the machine tool 10 can be moved in two translation degrees of freedom as well as one rotational degree of freedom.

The machine tool 10 features a control unit 38 by means of which the electric motors 36.$i$ and the positioning system are driven.

A rotation device 40 is arranged in the kinematic chain between the machine bed head and the main body 12. The struts 26.1, 26.2, 26.3 are attached on the machine bed head side of the rotation device 40. The struts 26.4 . . . , 26.8 are attached to a main body side part 42. The machine bed head 14 can be rotated by means of the rotation device 40 about a rotational axis which forms an angle of at most 20° with the horizontal.

The rolling chassis 32 features a lifting device 44 which comprises a first lifting carriage 46.1 and a second lifting carriage 46.2. These lifting carriages 46.1, 46.2 can be used to set the main body on the ground 48. Once the upper body 12 has been lifted, the machine tool 10 can be moved using the rolling chassis 32.

Figure 2:

FIG. 2 depicts a view of a strut 26, using strut 26.1 as an example. It can be seen that the floor 28.1 is attached to the slide 30. A head point 50.1 of the strut 26.1 is attached to the machine bed head 14.

FIG. 2 shows that the strut 26.1 is attached to the main body 12, namely by means of the slide 30, via a ball joint 52. The strut 26.1 is also attached to the machine bed head 14 via a second ball joint 54.1.

The strut 26.1 has a pre-loading device 56.1, which is a screw drive 68 in the present case. An outer thread 60 of a first rod element 62 meshes with an inner thread 64 configured on a second rod element 66. In the present case, the inner thread 64 is configured on a sleeve 68. If the sleeve 68 is rotated relative to the first rod element 62, a length $L_{26.1}$ changes. This causes the struts 26.$i$ of the frame 24 to brace (cf. FIG. 1).

Figure 3:
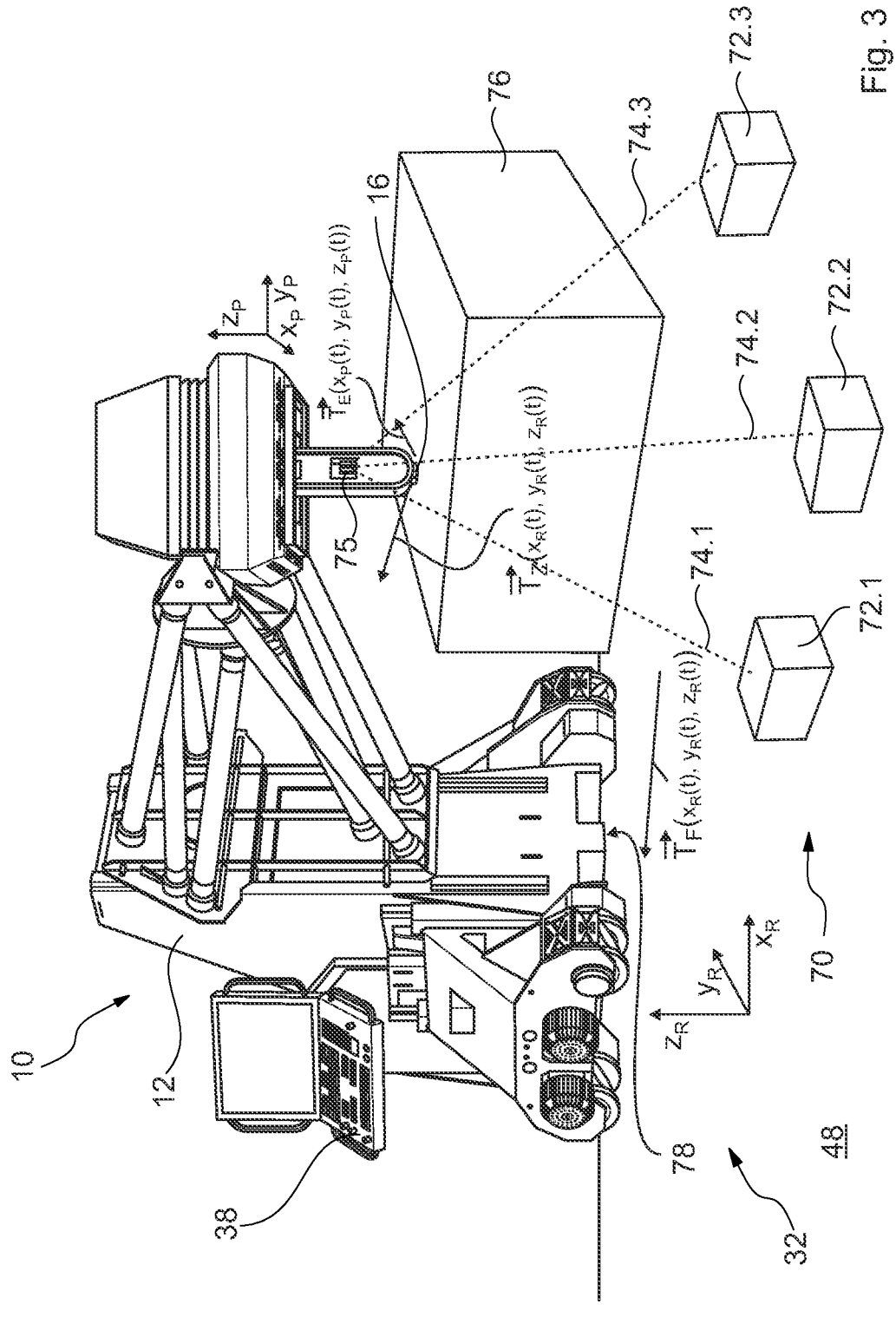

FIG. 3 shows a schematic view of the machine tool 10 according to the invention for explaining a method according to the invention. The rolling chassis 32 is first driven in such a way that the machine tool 10 moves relative to the ground along a chassis trajectory $T_F$. In addition, the positioning system 18 is driven in such a way that the end effector 16 moves along an end effector curve $T_E$. The end effector curve $T_E$ is measured in terms of a coordinate system which is stationary relative to the machine bed head 14. The chassis trajectory $T_F$, on the other hand, is measured relative to a stationary coordinated system whose coordinates carry the index R. This results in a target trajectory $T_Z$, which is stored in a digital memory of the control unit 38.

The mobile machine tool comprises a position measurement device 70, in the present case in the form of a tracking interferometer 70, which can feature one, two or three laser units 72.1, 72.2 or 72.3. Each laser unit emits a laser beam 74.1, 74.2 and 74.3 respectively onto a retroreflector 75. In this way, an end effector position $P_{ist}$ is measured. The control unit 38 detects the end effector position $P_{ist}$ and compares this with an end effector target position $P_{Soll}$ resulting from the target trajectory $T_Z$. If this end effector target position deviates from the end effector position $P_{ist}$, the control unit 38 changes the end effector curve $T_E$ such that the end effector position $P_{ist}$ approaches the end effector target position $P_{Soll}$. It should be noted that the tracking interferometer 70 is only practical if the requirements concerning accuracy with which the end effector 16 is to process a workpiece 76 are particularly high. For lower accuracy requirements, for example with build-up welding, a tracking interferometer 70 is unnecessary. The workpiece 76 is, for example, a forming tool, such as a die.

To process the workpiece 76 with a high degree of accuracy, the rolling chassis 32 is driven in such a way that it sinks and moves into a set-down position. This set-down position sets the main body on a set-down surface 78 on the ground 48. The end effector position $P_{ist}$ of the end effector 16 relative to the workpiece 76 is then determined, in particular by means of the tracking interferometer 70. The workpiece 76 is subsequently processed by means of the end effector 16. It is convenient, but not essential, if the tracking interferometer follows the movement of the end effector and its end effector position $P_{ist}$ is constantly controlled to its respective end effector set position $P_{Soll}$.

REFERENCE LIST 10 machine tool
12 main body
14 machine bed head
16 end effector
18 positioning system
20 linear axle
22 rotation unit
24 frame
26 strut
28 base point
30 slide
32 rolling chassis
34 Mecanum wheel
36 electric motor
38 control unit
40 rotation device
42 part
44 lifting device
46 lifting carriage
48 ground
50 head point
52 ball joint
54 second ball joint
54 pre-loading device
58 screw drive
60 outer thread 62 rod element
64 inner thread
66 second rod element
68 sleeve
70 tracking interferometer
72 laser unit
74 laser beam
75 retroreflector
76 workpiece
78 set-down surface
i, j running index
$L_{26}$ length of a strut
N number of struts
$P_{Soll}$ end effector target position
$P_{ist}$ end effector position
$T_F$ rolling chassis trajectory
$T_E$ end effector curve
$T_Z$ target trajectory

The invention claimed is:

1. A mobile machine tool, comprising:
a main body with which the mobile machine tool stands on a ground surface,
a machine bed head cantilevered relative to the main body, wherein the machine bed head comprises a positioning system,
an end effector guidable on the machine bed head by the positioning system,
a mechanically overdetermined frame, wherein the machine bed head is attached to the main body by the mechanically overdetermined frame,
wherein an entirety of the end effector is moveable along a trajectory relative to the machine bed head by the positioning system alone.

2. The mobile machine tool according to claim 1, wherein the mechanically overdetermined frame comprises at least two struts which differ in their natural frequencies by at least 7%.

3. The mobile machine tool according to claim 1, wherein the mechanically overdetermined frame is at least doubly mechanically overdetermined.

4. The mobile machine tool according to claim 1, wherein the mechanically overdetermined frame comprises at least one strut which comprises a pre-loader by which the at least one strut is braceable against the other struts.

5. The mobile machine tool according to claim 1, wherein the mechanically overdetermined frame comprises at least four struts articulated on the main body by ball joints.

6. The mobile machine tool according claim 1, wherein the positioning system comprises at least three axles.

7. The mobile machine tool according to claim 1, further comprising a rotation device for mounting the machine bed head such that the machine bed head can be rotated relative to the main body.

8. The mobile machine tool according to claim 7, wherein the machine bed head is rotatable by at least 170°.

9. The mobile machine tool according to claim 1, further comprising a rolling chassis configured for moving the mobile machine tool.

10. The mobile machine tool according to claim 9, further comprising a control that is designed to automatically carry out a method comprising the steps of:
(i) detection of a target trajectory of the end effector in space,
(ii) driving of the rolling chassis so that the mobile machine tool moves along a chassis trajectory in space, and (iii) driving of the positioning system so that the end effector moves along an end effector curve relative to the machine bed head such that the end effector moves along the target trajectory in space.

11. The mobile machine tool according to claim 10, further comprising a position measurement device designed to determine an end effector position in space relative to a workpiece.

12. The mobile machine tool according to claim 11, wherein the position measurement device is a tracking interferometer.

13. The mobile machine tool according to claim 12, wherein the control is configured to automatically execute a method comprising the steps of:
(i) continuous detection of an end effector position of the end effector in space by the tracking interferometer, and
(ii) control of the end effector position to an end effector target position according to the target trajectory by the positioning system.

14. The mobile machine tool according to claim 9, further comprising a control configured to automatically execute a method comprising the steps of:
(i) driving of the rolling chassis so that the mobile machine tool moves relative to the ground,
(ii) driving of the rolling chassis so that the main body is placed on the ground,
(iii) determination of an end effector position of the end effector relative to a workpiece, and
(iv) processing of the workpiece by the end effector.

15. The mobile machine tool of claim 14, wherein processing of the workpiece of the end effector comprising machining.

16. The mobile machine tool according to claim 1, further comprising at least one weighting element which is attachable to and detachable from the main body, wherein the at least one weighting element has a density of at least 1.5 g/cm³.

17. The mobile machine tool according to claim 16, wherein the density is at least 7.5 g/cm³.

18. A method for processing a workpiece, comprising the steps of:
(i) movement of a mobile machine tool according to claim 1 towards a workpiece, and
(ii) movement of the entirety of the end effector relative to the machine bed head by the positioning system for milling of the workpiece by the end effector.

19. The method according to claim 18, further comprising:
(i) changing of a length of at least one strut such that a position of the positioning system changes, and
(ii) bracing of the mechanically overdetermined frame.

20. The mobile machine tool according to claim 1, further comprising at least one weighting element which is attachable to and detachable from the main body, wherein the at least one weighting element has a mass of at least 300 kg.

21. The mobile machine tool according to claim 20, wherein the mass is at least 500 kg.

22. A mobile machine tool, comprising:
a main body with which the mobile machine tool stands on a ground surface,
a machine bed head cantilevered relative to the main body, wherein the machine bed head comprises a positioning system,
an end effector guidable on the machine bed head by the positioning system,
a rolling chassis configured for moving the mobile machine tool, a mechanically overdetermined frame, wherein the machine bed head is attached to the main body by the mechanically overdetermined frame, wherein an entirety of the end effector is moveable along a trajectory relative to the machine bed head by the positioning system alone, and a position measurement device designed to determine an end effector position in space relative to a workpiece.

23. The mobile machine tool according to claim 22, wherein the positioning system comprises at least one linear axis.

24. The mobile machine tool according to claim 23, wherein the positioning system comprises at least three linear axes.

25. The mobile machine tool according to claim 22, wherein the rolling chassis has at least one Mecanum wheel.

26. The mobile machine tool according to claim 22, wherein the rolling chassis has at least one omni wheel.

27. The mobile machine tool according to claim 22, wherein the position measurement device is a tracking interferometer.

\* \* \* \* \*